(12) United States Patent
Hurtta et al.

(10) Patent No.: US 7,688,745 B1
(45) Date of Patent: Mar. 30, 2010

(54) COMMUNICATION SYSTEM AND METHOD PROVIDING A MODE SELECTION PROCEDURE

(75) Inventors: Tuija Hurtta, Espoo (FI); Mikko Puuskari, Helsinki (FI); Shkumbin Hamiti, Espoo (FI); Teemu Jäppinen, Espoo (FI); Marc Greis, Irving, TX (US); Serge Haumont, Helsinki (FI)

(73) Assignee: Nokia Siemens Networks Oy, Espoo (FI)

( * ) Notice: Subject to any disclaimer, the term of this patent is extended or adjusted under 35 U.S.C. 154(b) by 1381 days.

(21) Appl. No.: 10/343,706

(22) PCT Filed: Aug. 14, 2000

(86) PCT No.: PCT/EP00/07932

§ 371 (c)(1),
(2), (4) Date: Sep. 8, 2003

(87) PCT Pub. No.: WO02/15625

PCT Pub. Date: Feb. 21, 2002

(51) Int. Cl.
*H04L 12/26* (2006.01)
(52) U.S. Cl. ............... 370/252; 370/401; 370/465
(58) Field of Classification Search ........... 370/465, 370/231, 235, 236, 276, 277, 312, 329, 332, 370/354, 389, 392, 393, 445, 467, 521, 401, 370/326, 252; 455/435.1, 435.2, 450, 455
See application file for complete search history.

(56) References Cited

U.S. PATENT DOCUMENTS 5,452,287 A 9/1995 DiCecco et al.
5,568,525 A * 10/1996 de Nijs et al. ............... 375/356

(Continued)

FOREIGN PATENT DOCUMENTS

JP 11-017840 1/1999

(Continued)

OTHER PUBLICATIONS

Delphine Plasse, "Call Control Scenarios in the "all-IP" UMTS Core Network", pp. 322-326.

(Continued)

*Primary Examiner*—Ricky Ngo
*Assistant Examiner*—Gary Mui
(74) *Attorney, Agent, or Firm*—Squire, Sanders & Dempsey L.L.P.

(57) ABSTRACT

The invention relates to a method and a communication system comprising at least one first network element connectable to a second network element. At least one of the first and second network elements use one of two or more selectable modes for communicating with another network element. One or both of the network elements, or a third network element, which is connectable with the first and second network elements, performs a mode selection procedure for selecting the same mode for bidirectional communication between the network elements. The modes preferably are different codec types, channel-coding schemes, or radio interface protocol types. The first and/or second network elements may be portable terminal equipments and the third network element preferably is a support node or a means providing a support function such as a CSCF. The mode selection ensures use of one and the same mode, such as a codec, in uplink and downlink directions enabling IP telephony in UMTS using SIP protocol.

23 Claims, 4 Drawing Sheets

U.S. PATENT DOCUMENTS

| | | | | |
|---|---|---|---|---|
| 5,586,117 | A * | 12/1996 | Edem et al. | 370/466 |
| 5,646,945 | A * | 7/1997 | Bergler | 370/419 |
| 5,924,026 | A | 7/1999 | Krishnan | |
| 6,058,115 | A | 5/2000 | Sawyer et al. | |
| 6,075,787 | A | 6/2000 | Bobeck et al. | |
| 6,104,929 | A * | 8/2000 | Josse et al. | 455/445 |
| 6,108,560 | A * | 8/2000 | Navaro et al. | 455/517 |
| 6,125,122 | A * | 9/2000 | Favichia et al. | 370/466 |
| 6,208,638 | B1 | 3/2001 | Rieley et al. | |
| 6,356,533 | B1 * | 3/2002 | Bruno et al. | 370/252 |
| 6,366,577 | B1 | 4/2002 | Donovan | |
| 6,434,168 | B1 * | 8/2002 | Kari | 370/521 |
| 6,522,658 | B1 | 2/2003 | Roccanova | |
| 6,584,098 | B1 * | 6/2003 | Dutnall | 370/354 |
| 6,654,610 | B1 * | 11/2003 | Chen et al. | 455/450 |
| 6,658,235 | B1 | 12/2003 | Tolmunen et al. | |
| 6,798,786 | B1 * | 9/2004 | Lo et al. | 370/468 |
| 6,839,339 | B1 | 1/2005 | Chuah | |
| 7,031,703 | B1 * | 4/2006 | Graf et al. | 455/432.1 |
| 7,046,658 | B1 | 5/2006 | Kundaje et al. | |
| 7,072,336 | B2 | 7/2006 | Barany et al. | |
| 7,212,543 | B1 * | 5/2007 | Arwald et al. | 370/466 |
| 2001/0005382 | A1 * | 6/2001 | Cave et al. | 370/466 |
| 2001/0026548 | A1 * | 10/2001 | Strathmeyer et al. | 370/356 |
| 2002/0034166 | A1 * | 3/2002 | Barany et al. | 370/329 |
| 2003/0031200 | A1 * | 2/2003 | Lehtimaki | 370/467 |

FOREIGN PATENT DOCUMENTS

| | | |
|---|---|---|
| JP | 11-163960 | 6/1999 |
| JP | 11-313371 | 11/1999 |
| WO | 97/48212 | 12/1997 |
| WO | WO 99/12329 A1 | 3/1999 |
| WO | 01/08434 | 2/2001 |
| WO | WO 02/15627 A1 | 2/2002 |

OTHER PUBLICATIONS

Thernelius, "SIP, NAT, and Firewalls," Master's Thesis, May 2000, pp. 1-69.

Beser, "Codec Capabilities Attribute for SDP; draft-beser-mmusic-capabilities-00.txt," Mar. 2000, 11 pages.

* cited by examiner

COMMUNICATION SYSTEM AND METHOD PROVIDING A MODE SELECTION PROCEDURE

BACKGROUND OF THE INVENTION

1. Field of the Invention

The present invention relates to a communication system for performing a mode selection by selecting or negotiating the mode to be used, a method to be performed in such a communication system, and to a network element capable of mode selection.

2. Description of the Prior Art

Communication networks transfer information such as user voice traffic or the like, on a packet-switched and/or circuit-switched basis using modes which may be commanded by the system or negotiated between the involved network elements such as end user equipments. As an example, in planned evolution of networks such as UMTS (Universal Mobile Telecommunication System) systems, additional functions and services can be incorporated. For instance, novel multimedia services, such as multimedia messaging services MMS, are supported within the system which services are IP (Internet Protocol)-based services. Packet-based (e.g. IP-based) service sessions such as multimedia service sessions may be controlled by a specific protocol. As an example, the Session Initiation Protocol (SIP) represents a protocol which may be used for example for call and connection establishment as well as for transport of endpoint capability information. Such capability information may for example relate to voice and multimedia codecs supported by the end terminals.

The functionality and services of such multimedia service systems are mapped onto the existing network system functions, for example of UMTS type. As an example, the system services may be mapped to the PDP contexts and radio signalling, as well as to existing packet-switched core network elements and interfaces, for example of a UMTS type. Hence, there is a problem of multimedia (e.g. IP multimedia) and network layer (e.g. GPRS layer) interactions and mapping.

As an example, in case of VoIP calls (voice over IP-based connection, that is Internet telephony), the radio access network such as GERAN ("GSM/Edge Radio Access Network") and UTRAN (UMTS Terrestrial Radio Access Network), may be informed of the type of application for deciding of the header adaptation method to be used for example a particular PDP context. As an example, two different header adaptation schemes available for selection can for example be "header compression" and "header stripping/removal". The header stripping/removal mode may be used for speech-only traffic where for example optimized speech transport is required for instance for integrated lower-end terminal devices. A header compression mode may be utilized for example for more general IP multimedia traffic including voice application operation on an external device such as a laptop computer connected to a UMTS phone.

When an inappropriate mode such as inappropriate protocol mode, header adaptation mode or radio access bearer mode are selected, problems in incorrect message transmission may occur.

SUMMARY OF THE INVENTION

A communication system, and/or a method to be performed in a communication system in accordance with the invention, comprises at least one first network element connectable to a second network element via one or more packet-based networks. At least one of the first and second network elements provide two or more selectable modes for communicating with another network element. A mode selection procedure is performed (for example by one or both of the network elements, or by a third network element connected to the first and second network elements), for selecting the same mode for bidirectional communication between the network elements. The selectable modes preferably are different codec types, or may be conversion modes of other type, or radio interface protocol types or channel-coding schemes etc.

The first and/or second network elements may be portable terminal equipments. The third network element preferably is a support node or support function.

In a preferred embodiment, a protocol mainly used for other purposes but also capable of providing a messaging service, preferably an IP-based multimedia messaging service, is used for sending information on supported or selected modes to and from the network elements. The protocol may be the Session Initiation Protocol (SIP). SIP is a multimedia session establishment & control protocol, that is a control protocol for realtime multimedia.

Preferably, the network or networks connecting the first and second network elements is/are UMTS-based network.

In one embodiment, the first network element may send information on one or more modes supported by the first network element to the third network element which performs the selection procedure and sends information on only one or more than one but not all supported modes to the second network element which sends an acknowledgment message to the third network element confirming the support of the selected, or one of the selected modes, the third network element sending a message to the first network element informing the latter on the selected mode. This is one difference between a preferred embodiment of the invention and the usual SIP operation. Usually there is no negotiation between the used codecs etc. but both elements include information on their own capabilities in the SIP messages. Here, a selection and a specific usage of the information fields etc. is proposed.

In another embodiment, the first network element may send information on one or more modes supported by the first network element to the third network element which requests the second network element to send information on the supported modes, the second network element returning a list of supported modes to the third network element whereupon the third network element performs the selection procedure and sends messages to the first and second network elements informing these network elements on the selected mode.

In a further embodiment, there are the following steps: a) the first network element performs the selection procedure when initiating a connection to the second network element, and sends information on one mode supported by the first network element to the second network element; b) The second network element, when supporting the mode, returns an acknowledgement message, or, when not supporting the mode, returns a message indicating another mode supported by the second network element, to the first network element; c) The first network element selects this mode for further communication when supporting it, or, d) when the first network element does not support the mode indicated by the second network element repeats the steps a) to d) selecting another mode.

In a further embodiment, the first network element, when initiating a connection to the second network element, sends information on all modes supported by the first network element to the second network element. The second network element performs the selection procedure and returns a message indicating the selected mode to the first network element, the first and second network elements selecting the indicated mode for further communication.

The first network element and/or second network element and/or third network element preferably send information on the selected mode to a radio network control means. The information on the selected protocol mode may for example be sent as part of a negotiation procedure related to packet data convergence protocol, or in an Activate PDP Context message. The information on the selected mode preferably contains an additional flag indicating the application type. It is possible to send only the application type and no other information.

The information on the selected mode preferably contains additional information on the header processing such as header compression or header stripping/removal.

Generally, in accordance with the present invention, a selection procedure is provided for performing a mode selection, preferably when establishing a connection between two network elements. This mode selection such as protocol selection ensures that the bi-directional communication between the network elements is performed in a defined manner such as use of the same mode in uplink and downlink direction.

As an example, such a mode selection is able to ensure that for example the radio access bearers in an UMTS network use and support the same codec type (for example AMR (Adaptive Multi-Rate), GSM FR (Full Rate), GSM EFR (Enhanced Full Rate), etc.) at the same time, and use the same, i.e. only one, codec type in uplink and downlink directions. In some cases such as AMR, there might otherwise be provided different codec modes in the uplink and downlink directions. The codec information may be used to select the appropriate radio interface protocol modes including an appropriate channel coding scheme for voice traffic.

The use of the same codec in both directions guarantees that the channel coding for the corresponding radio bearer of a PDP (Packet Data Protocol) context is appropriately and correctly selected so as to be the same in both directions. As at least one PDP context is necessary for carrying the voice traffic, an appropriate radio bearer is selected so that UMTS IP telephony can be performed (VoIP) without problems.

An advantage of the invention is the possibility to enable for example SIP operation on top of an UMTS radio access network architecture and bearers. Apart from the fact that the new information on selected mode and application type provided to the radio access network is already a sort of change of the existing network architecture, no other changes of existing radio access networks such as UTRAN or GERAN for any actual or future definition such as 3GPP Release 2000 are necessary for solving the above mentioned problems. The invention therefore provides a solution for IP telephony on UMTS.

The solution according to the invention can be implemented as a proprietary mechanism or function, or can be a standardized mechanism or function.

In accordance with a further aspect of the invention, a network element is provided, preferably to be used in a method or communication system as described above, the network element performing a selection procedure for selecting one of several modes supported by this or another network element. The modes may be different conversion modes, in particular coding/decoding modes.

Further aspects, advantages and details of the invention are be described by referring to the attached drawings which disclose preferred embodiments of the invention.

DETAILED DESCRIPTION OF PREFERRED EMBODIMENTS OF THE INVENTION

Before describing some embodiments of the invention in more detail, several general aspects and features of the invention will be discussed. In connection set-up, some protocols such as the call establishment procedures of SIP (Session Initiation Protocol) allow negotiation and usage of several codecs from end-to-end, that is between the call originating element and the call terminating element. Further, such protocols may also allow the use of different codecs in uplink and downlink directions. Due to the selection procedure performed in accordance with a preferred aspect of the invention, IP telephony applications in networks such as UMTS of third generation type can be used on top of the UMTS radio access networks (RANs) without interfering with the functionality of the system and with minimum changes of the system. Hence, correct functioning can be ensured also in such cases.

When using for instance SIP, the caller may send a set of supported codecs to the callee or to a third network element. The callee may also send a set of supported codecs to the caller or to the third network element. After the call-setup, when sending VoIP packets, the invention may be used to guarantee that the caller uses one of the codecs supported by the callee and the callee uses one of the codecs supported by the caller, and that these used codecs are the same for the callee and the caller. Otherwise, when not performing a mode selection procedure for selecting e.g. only one and the same codec for the bidirectional communication, the sender might dynamically select a codec from the set of codecs supported by the recipient when sending data to the latter so that different codecs might eventually be used. Furthermore, the used codec might be different in different directions.

In accordance with preferred implementations of the invention, several alternatives are disclosed. According to one aspect, a terminal equipment (network element), e.g. a UMTS phone, or the network, e.g. the UMTS network, functions so as to ensure that always only one codec type is used in each direction, and further that this codec type is the same in both directions. This may be achieved in one or both terminal equipments such as UMTS terminals by mandating support for specific codec(s) in all cases and/or by defining that only one codec can be announced to the other endpoint as supported codec.

Furthermore, the behaviour of the callee is defined in such a manner that the call terminating equipment selects, if possible, the same codec as the one announced by the call originating equipment. When failure of the call terminating equipment occurs in selecting the same codec as the one announced by the call originating equipment, the call terminating equipment preferably selects a codec which is mandatory in systems of the third generation (3G systems), and announces this codec to the call originating equipment. The call originating equipment supports the announced codec as it is a mandatory one, and assumes at this point that the call terminating equipment uses the same codec also in sending data, and will therefore adjust its behaviour accordingly.

In accordance with another alternative embodiment of the invention, a further solution is provided. In the network such as the UMTS network, a control means (third network element) decides on the codec to be used and handles the selection procedure and the necessary messages to be sent to the call originating and terminating equipments. This control means may for example be the CSCF (Call State Control Function) of the network and/or may e.g. be the proxy CSCF in the visited network such as PLMN (Public Land Mobile Network) in the case of a roaming subscriber, and/or the home CSCF in the home network for example PLMN of the subscriber.

The control means can render the decision on the codec to be used by both the call originating and terminating equipments. In the preferred implementation, the codecs supported by the call originating equipment are included in a specific message such as the Invite message of SIP. After receiving the Invite message, the control means such as CSCF can select one of the codecs, for example perform the mode selection procedure, and can modify the Invite message so as to include only the selected codec before forwarding the Invite message to the call terminating equipment. The call terminating equipment is adapted to acknowledge receipt the Invite message by sending an acknowledgement message such as 200 OK message of SIP, only if it supports the single codec indicated in the Invite message as selected by the control means. It is possible to send an acknowledgement message also in the negative case, for example, giving negative acknowledge or including the supported codecs by the call terminating equipment.)

The selection procedure performed in the control means such as CSCF may be based for example on the operator preferences. As an example, when the operator prefers to use AMR, the selection procedure selects AMR from a set including FR, HR and AMR. Another example is a case when a transcoder pool is used. In such a case, the operator may optimize the usage of the transcoders. In the latter case, the decision and selection is preferably made in a control means of the visited network, that is in a visited network element such as for example in the proxy CSCF.

Furthermore, location information of the user may be taken into account when deciding on the codec to be used. For example, if the base station subsystems (BSSs) in different parts of the network/country are for example based on different product releases and for this or other reasons prefer different codecs, or for reasons of transcoder pool optimization, the codec selection procedure may take account of such parameters.

A further alternative approach implemented in another embodiment of the invention is the selection of the codec by a control network element such as CSCF after having received information on all codecs supported by the call originating equipment (for example in an Invite message) and on all codecs supported by the call terminating equipment (for example in the 200 OK message of SIP). After having received both the messages, the control means knows both codec sets supported by the call originating equipment as well as by the call terminating equipment. The control means then performs the mode selection step by selecting one codec supported by both call originating and terminating equipments either by arbitrarily or by reference to a priority list ranking the codecs according to the priority assigned by e.g. the network operator or service provider.

After selecting the codec to be used by both call originating and terminating equipments, the selected codec is sent to the call originating equipment in a further message such as a 200 OK message of SIP generated by modifying the 200 OK message received from the call terminating equipment, and to the call terminating equipment in another message such as a ACK message of SIP.

When the codec to be used has been selected, at least one network element, in particular a control element such as the radio network controllers or base station subsystems controlling the radio access to the call originating and/or call terminating equipment, have to be informed on the selected codec. This informing of the network control elements can be performed in several alternative ways which are listed below in the preferred order.

1.) The call originating and/or terminating equipment such as a mobile station (MS) sends information on the selected codec to the radio access controller (for example RNC, Radio Network Controller) as part of the PDCP (Packet Data Convergence Protocol) negotiation. The messages sent to the control element informing the same about the selected codec may additionally include a separate flag or other indication to indicate the application type, and/or whether to use header compression or header stripping/removal for this particular PDP context.

2.) As an alternative, the call originating and/or terminating equipment sends the information on the selected codec to the serving node such as SGSN (Serving GPRS Support Node). The serving node forwards the information on the selected codec to the control element such as a RNC in the RAB (Radio Access Bearer) establishment request message. The transmitted message(s) may additionally include further information such as a flag to indicate the application type, and/or whether to use header compression or stripping/removal for a particular PDP context.

3.) The call state controlling means such as CSCF may send information on the selected codec to the radio access control means such as a RNC (for example in the following manner: CSCF→GGSN (Gateway GPRS Support Node), GGSN→SGSN, SGSN→RNC). As already stated above, the messages may also include a separate indication such as a flag to indicate the application type, and/or whether to use header compression or stripping/removal for the particular PDP context.

When an application type indication (for example application type flag) is included, the information on the application type is transmitted from the call originating or terminating equipment (for example Mobile Station MS) or from the call control means (for example CSCF) because these entities are, in an UMTS network, the only entities having enough information about the services and applications running on top of the PDP contexts. The header compression is preferably set as the default operation if the application type is not known or indicated in the message. The header stripping/removal is preferably used for optimized speech transmission when only voice traffic is carried in the PDP context.

The necessary application information is preferably received through internal application programming interfaces (APIs) of the call originating and/or terminating equipments (the internal APIs being arranged between the applications/services), the SIP layer and the UMTS/GPRS layers. Header stripping/removal is preferably used only with an integrated UMTS SIP terminal. It may also be provided from a laptop computer to a UMTS phone in a case where the terminal equipment (TE) and the call originating and/or terminating equipments are separate devices. The application type indication, such as a flag, may for example have the following explicit values: "header compression", or "header stripping/removal", or "application type" (for example value: voice) which indicates that stripping/removal is to be used.

Figure 1:
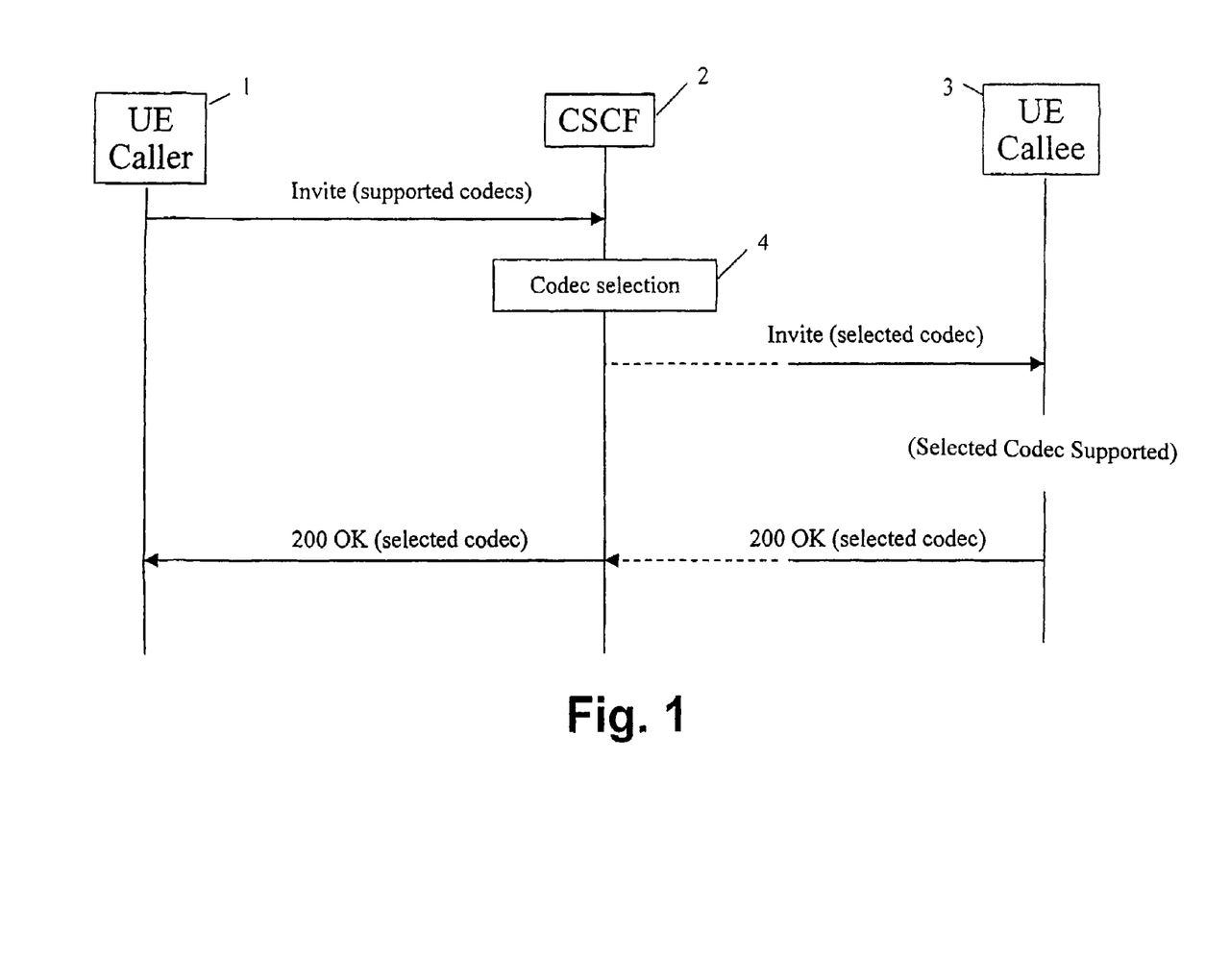
FIG. 1 shows the basic structure of a first embodiment of the present invention.

In the following, details of a first embodiment is described with reference tio FIG. 1. FIG. 1 shows a terminal network element 1 which is termed "UE (User Equipment) Caller" and requests the establishment of a connection to another network element 3. The network element 3 thus represents a call terminating equipment and is termed "UE Callee". The network comprises a further network element 2 which is a connection control element and is implemented as, or provides, a call state control function (CSCF). When the network element 1, such as a MS (Mobile Station), desires to establish a connection to the terminal network element 3, it sends, in this embodiment, a message to the CSCF 2 informing the latter on the desire to establish a connection to the terminal equipment element 3 which message contains information on all codecs supported by the network element 1, that is the call originating equipment. This message may be an Invite message of the connection protocol, preferably SIP. This Invite message contains a list of codecs supported by network element 1.

The CSCF element 2 performs a mode selection procedure which, in this embodiment, is a codec selection procedure 4 selecting one of the codecs supported by equipment 1. This codec selection 4 may be based on preference or priority parameters contained in CSCF 2, or may be dependent from the type of application desired by equipment 1 such as pure data transmission, pure voice over IP transmission, and the like.

After performing the codec selection procedure 4, the CSCF 2 further transmits the Invite message to the user equipment 3 with the message now only including the codec selected by the codec selection procedure 4. The user equipment 3, which may likewise be a mobile station or a stationary equipment, performs an internal check whether it supports the codec indicated in the received Invite message. If yes, the user equipment 3 returns an acknowledgement message to the CSCF 2 (preferably a 200 OK message in SIP) which message repeats the selected codec for confirmation of its support by user equipment 3. The CSCF 2 transmits this acknowledgement message to the user equipment 1 (200 OK (selected codec)) in SIP.

When receiving this message, the user equipment 1 uses only this indicated codec for uplink and downlink links. In a similar manner, user equipment 3 uses only the selected codec for uplink and downlink traffic, that is for radio access between user equipment 3 and the radio access controlling means such as RCP (Radio Network Controller). The radio network controllers handling the radio access to the user equipments 1 and 3 is likewise informed on the selected codec using one of the above-mentioned methods as an example, and adapts their operation mode accordingly.

When the user equipment 3 should not support the selected codec indicated in the Invite message received from CSCF 2, it preferably sends a message to CSCF 2 informing the latter on lack of support of the selected codec. Thereupon, the CSCF 2 repeats the codec selection procedure 4 but now selects another codec different from the first selected codec, and sends this newly selected codec in a message such as an Invite message to user equipment 3. When this codec is supported by user equipment 3, it returns the 200 OK message, otherwise the above steps are repeated until a codec is selected which is supported by the user equipment 3.

Figure 2:
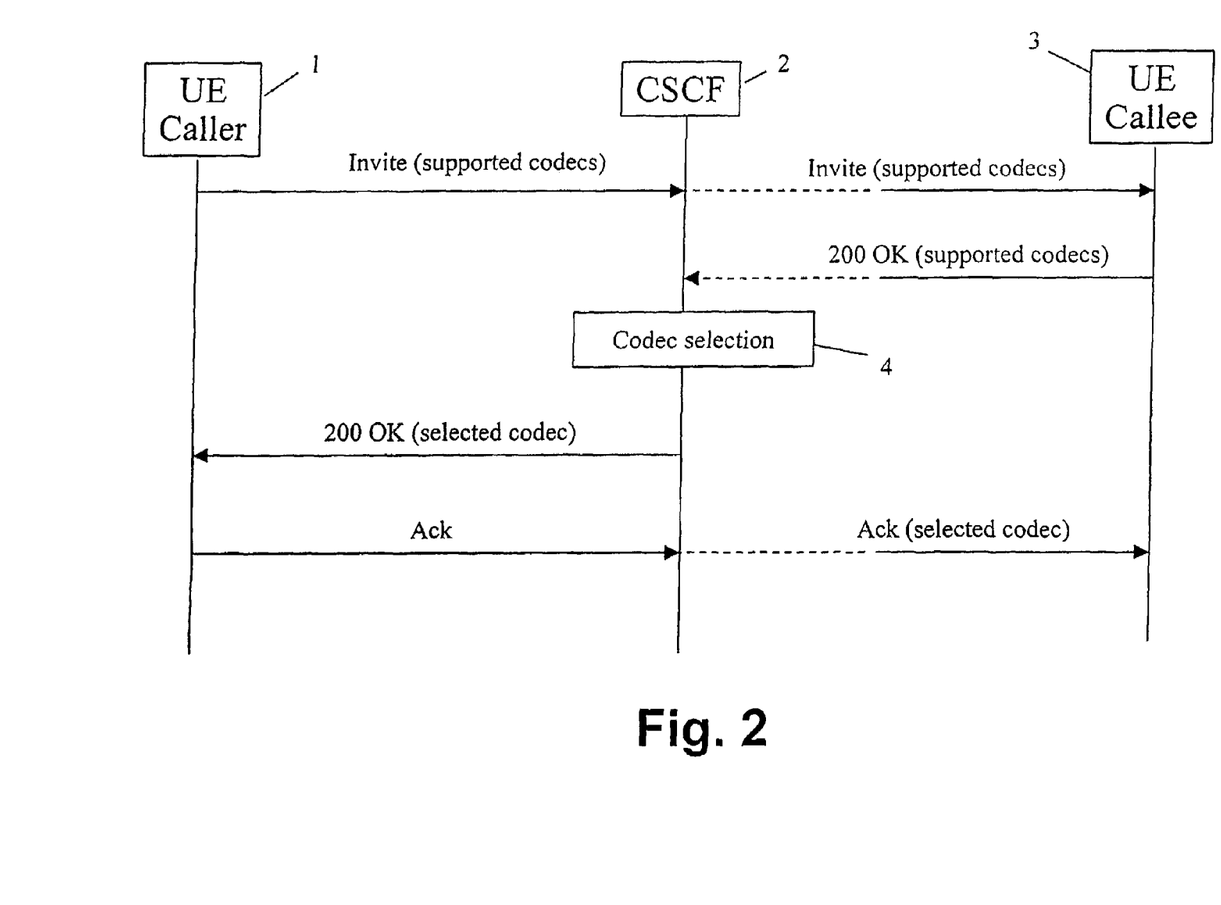
FIG. 2 illustrates a second embodiment of the invention.

FIG. 2 shows another embodiment of the invention wherein the codec selection procedure 4 is performed, similar as in the first embodiment, by CSCF 2. Contrary to the above discussed first embodiment, the CSCF 2 requests, after receipt of an Invite message indicating all or at least some of the codecs supported by the user equipment 1, the user equipment 3 to return information on all codecs supported by user equipment 3. This message may be an Invite message of SIP defining a request for returning a list of supported codecs. The user equipment 3 returns a message (e.g. 200 OK message of SIP) which contains a list of codecs supported by user equipment 3.

This list may contain all codecs supported by user equipment 3, or may indicate only those codecs which are also supported by the user equipment 1. In the latter case, the user equipment 3 receives, in the Invite message from CSCF 2, a list of the codecs supported by the user equipment 1, and performs a comparison of codecs supported by user equipment 1 and codecs supported by user equipment 3, selecting only those codecs which are supported by both user equipments 1 and 3. In the former case in which the list returned by the user equipment 3 includes all supported codecs, the Invite message sent from CSCF 2 to the user equipment 3 may not contain any indication of codecs supported by user equipment 1.

The CSCF 2 selects, by the codec selection procedure 4, one of the codecs supported by both user equipments 1 and 3, and then sends messages to both user equipments 1 and 3 informing them on the selected codec for use thereof during the subsequent connection. The message addressed to user equipment 1 may be a message 200 OK of SIP indicating the selected codec. The user equipment 1 may return an acknowledgement message to the CSCF 2 acknowledging the receipt of the 200 OK message and eventually repeating the selected codec. The CSCF 2 may forward the acknowledgement message received from user equipment 1 to user equipment 3 after adding (if not already included) an information indicating the selected codec.

The embodiment of FIG. 2 contributes to a very quick selection of a codec supported by both user equipments.

All explanations, features and advantages stated above with regard to the first embodiment are also applicable with regard to this second embodiment (unless being in contradiction to the above explanations), and also for the subsequently discussed embodiments 3 and 4.

Figure 3:
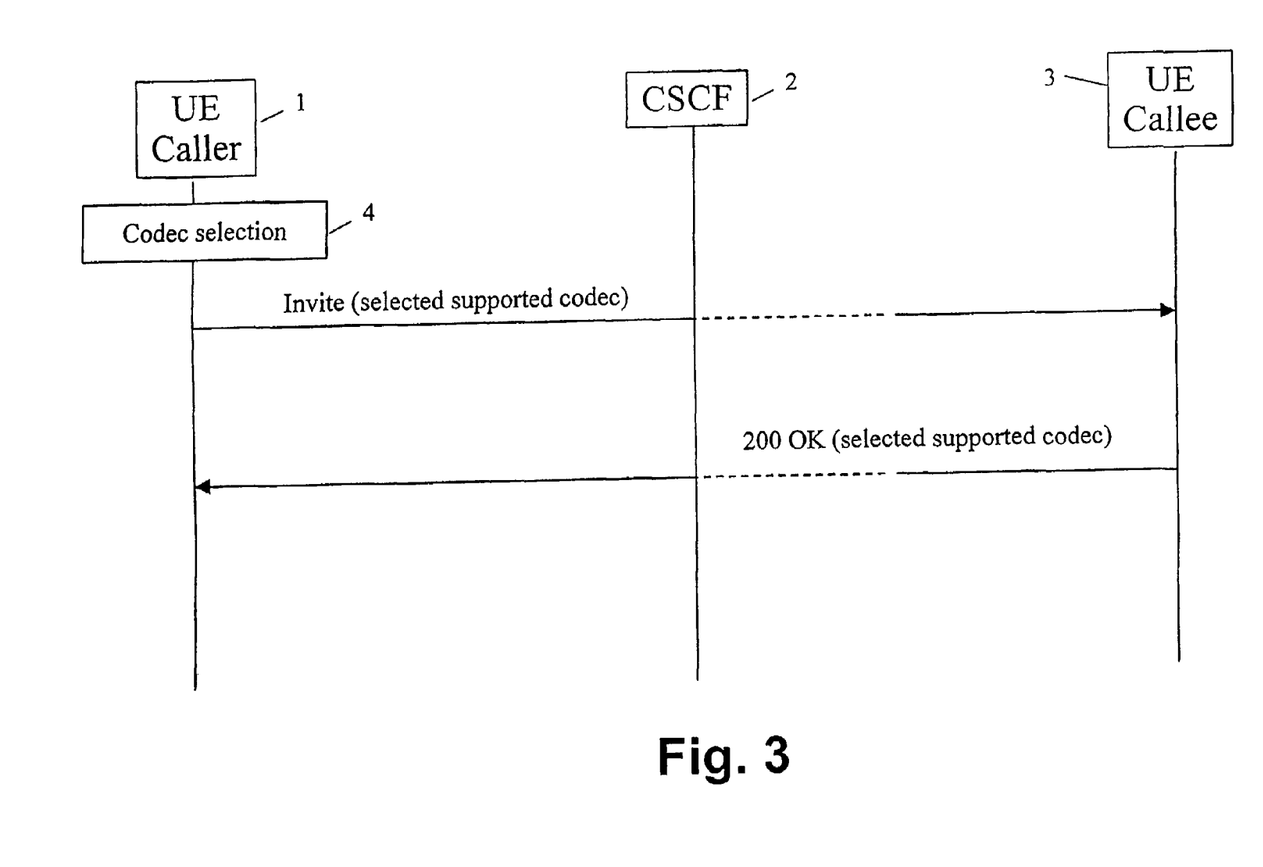
FIG. 3 shows another embodiment of the invention.

The embodiment shown in FIG. 3 is different from the above discussed first and second embodiment in that the codec selection procedure 4 is performed by and in the user equipment 1. After having performed the codec selection depending on the intended application (voice transmission, non-real-time traffic or the like, or depending on other parameters, the user equipment 1 sends a message, such as an Invite message, to the user equipment 3 via the CSCF 2, indicating the selected codec. The user equipment 3, when supporting the selected codec, returns, via CSCF 2, an acknowledgement message which may be a 200 OK message indicating the selected supported codec.

In case user equipment 3 does not support the selected codec, the repetition of the codec selection procedure 4, including the transmission of the related messaging, is repeated, as already stated above with regard to the first embodiment (with the exception that the code selection procedure 4 is repeated in the user equipment 1 and not in the CSCF 2. All other explanations given above with regard to the first and second embodiments likewise apply to this third embodiment.

Figure 4:
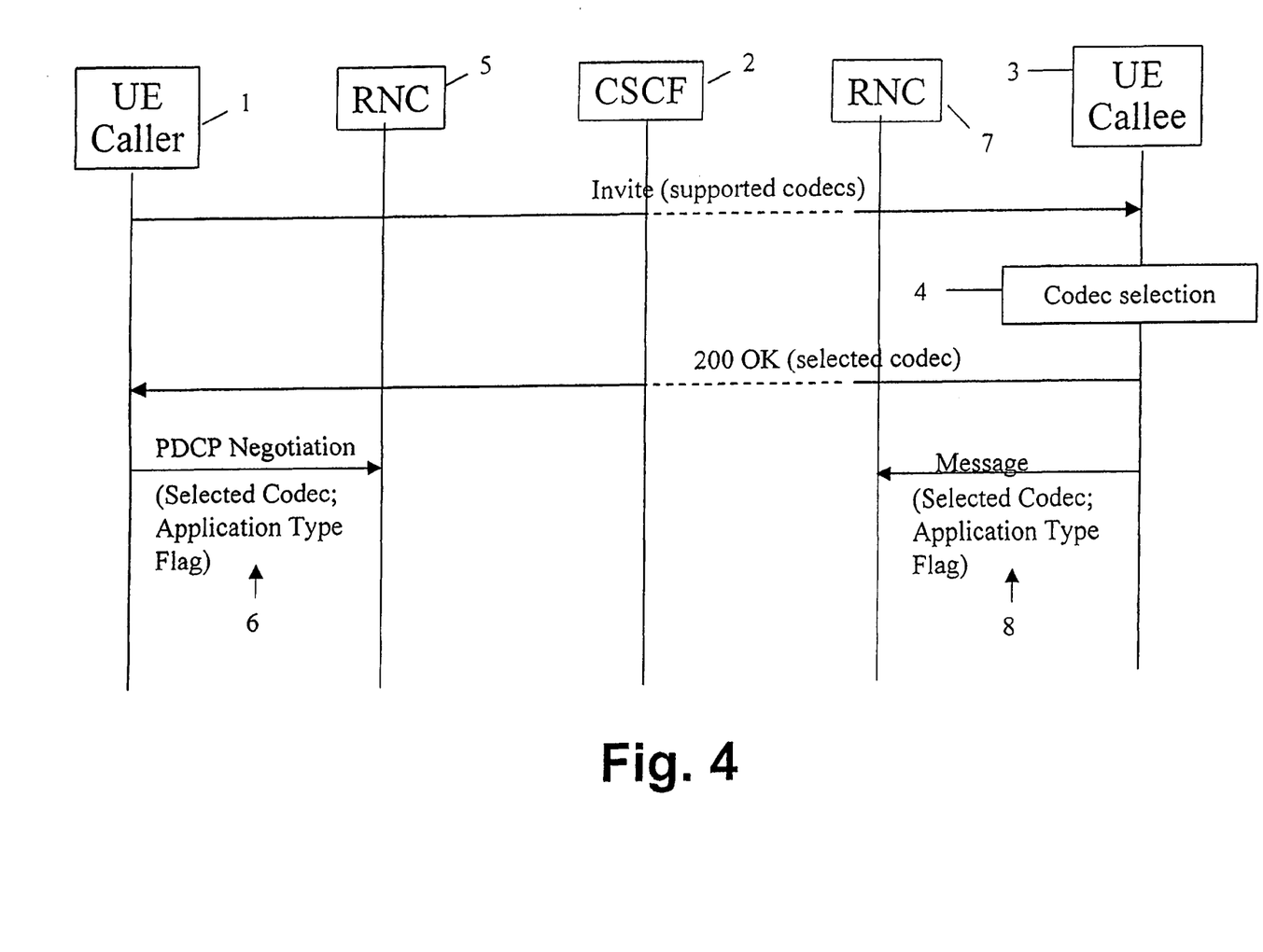
FIG. 4 illustrates a further embodiment of the invention.

FIG. 4 illustrates a fourth embodiment wherein the codec selection procedure 4 is performed in the user equipment 3. In this case, the user equipment 1 sends a message, via CSCF 2, to the user equipment 3 indicating all codecs supported by user equipment 1. This message may be an Invite message of SIP. After having received information on the codecs supported by user equipment 1, the user equipment 3 performs the codec selection procedure 4 by selecting, from the list of codecs supported by user equipment 1, one of the codecs which is also supported by user equipment 3. After having performed the codec selection procedure 4, the user equipment 3 sends a message to the user equipment 1, via the CSCF 2, informing user equipment 1 and eventually also CSCF 2, on the selected codec. The selected codec is thereafter used by both user equipments 1 and 3. All other explanations given above with regard to the first to third embodiment likewise apply to the present fourth embodiment.

As shown in FIG. 4 (the procedure shown in FIG. 4 is preferably common to all the earlier embodiments of the invention), a radio access controller such as RNC 5, in charge of radio access control to user equipment 1, is informed by user equipment 1 on the selected codec, and preferably also of the application type by sending an application type flag indicating for example "header compression" or "header stripping/removal". This information can be sent when performing the PDCP negotiation 6 but may also be sent in a separate message. In a similar manner, the user equipment 3 informs its radio access control element such as RNC 7 in charge of radio access control to user equipment 3 by sending a message 8 to RNC 7. This message indicates the selected codec and may also contain, if known, an application type flag.

This informing of the radio access control elements 5 and 7 in charge of the radio access to and from the user equipments 1 and 3, respectively, is likewise applicable to all above described first to third embodiments in identical manner.

Although preferred embodiments have been described above, the present invention is not limited thereto and covers also all modifications, amendments, additions and deletions of features within the abilities of a skilled man. As an example, the mode selection procedure has been described with reference to the codec selection but may also consist in a conversion modes selection of other type, a protocol selection procedure or the like.

The invention claimed is:

1. A method, comprising:
   configuring a second apparatus to be connectable to a first apparatus via at least one packet-based networks, at least one of the first and second apparatus providing two or more selectable codecs for communicating towards another apparatus of the first apparatus and the second apparatus;
   using, by the second apparatus, a codec selected for bidirectional communication between the second apparatus and the first apparatus;
   receiving, by the second apparatus, information on one or more codecs supported by the first apparatus from a third apparatus;
   comparing, by the second apparatus, the codecs supported by the first apparatus and codecs supported by the second apparatus;
   selecting, by the second apparatus, only those codecs which are supported by both the first and the second apparatus; and
   returning, by the second apparatus, a list of the codecs supported by both the first and the second apparatus to the third apparatus for performing a codec selection procedure for selecting a same codec for the bidirectional communication between the second apparatus and the first apparatus based on the list.

2. A method according to claim 1, wherein the codec selection procedure is performed by the first apparatus or the third apparatus.

3. A method according to claim 1, wherein the third apparatus is a support node or support function.

4. A selection method according to claim 1, wherein a call control is used for sending information on supported or selected codecs to and from the second, first, or a third apparatus.

5. A method according to claim 4, wherein a protocol providing the call control is a session initiation protocol.

6. A method according to claim 1, wherein the at least one network connecting the first and second apparatus is a universal mobile telecommunication system-based network.

7. A method according to claim 1, wherein at least one of the first apparatus, second apparatus and a third apparatus sends information on the selected codec to a radio network controller.

8. A method according to claim 7, wherein the information on the selected codec is sent as part of a negotiation procedure related to packet data convergence protocol, or in an activate packet data protocol context message.

9. A method according to claim 7, wherein the information on the selected codec comprises an additional flag indicating an application type.

10. A method according to claim 7, wherein the information on the selected codec comprises additional information on header processing such as header compression or header stripping/removal.

11. A system, comprising:
    at least one first network element connectable to a second network element via at least one packet-based network; and
    at least one of the first and the second network elements providing two or more selectable codecs for communicating towards another network element, the first and second network elements being user equipments,
    wherein the system is configured to perform a codec selection procedure, the codec selection procedure selecting the same codec for bidirectional communication between the network elements, and the codec selected is to be used in both directions in the bidirectional communication between the first and the second network elements,
    wherein the first network element is configured to send information on one or more codecs supported by the first network element to a third network element which forwards this information on the codecs supported by the first network element to the second network element,
    wherein the second network element is configured to perform a comparison of the codecs supported by the first network element and of codecs supported by the second network element, and select only those codecs which are supported by both the first and the second network element, and
    wherein the second network element is configured to return a list of the codecs supported by both the first and the second network elements to the third network element, the codec selection procedure being performed based on the list returned by the second network element.

12. A system according to claim 11, wherein the first network element or the third network element is configured to perform the codec selection procedure.

13. An apparatus, comprising:
    two or more selectable codecs configured to communicate towards another apparatus via at least one packet-based network, at least one of the apparatus and the another apparatus providing two or more selectable codecs for communicating towards the another apparatus of the first apparatus and the second apparatus, wherein the apparatus is configured to use a selected codec for bidirectional communication between the apparatus and the another apparatus, wherein the apparatus is configured to receive information on one or more codecs supported by the another apparatus from a third apparatus, wherein the apparatus is configured to perform a comparison of the codecs supported by the apparatus and of codecs supported by the another apparatus, and select only those codecs which are supported by both the apparatus and the another apparatus, and wherein the apparatus is configured to return a list of the codecs supported by both the apparatus and the another apparatus to the third apparatus for performing a codec selection procedure for selecting a same codec for the bidirectional communication between the second apparatus and the first apparatus based on the list.

14. An apparatus according to claim 13, wherein at least one of the apparatus and the another apparatus is a user equipment.

15. An apparatus according to claim 13, wherein at least one of the apparatus, the another apparatus, and the network element is configured to send information on the selected codec to a radio network control means.

16. An apparatus system according to claim 15, wherein the information on the selected codec comprises an additional flag indicating the application type.

17. An apparatus according to claim 15, wherein the information on the selected codec comprises additional information on header processing such as header compression or header stripping/removal.

18. An apparatus, comprising:
a processor configured to perform a codec selection procedure, the codec selection procedure selecting a same codec for bidirectional communication between a first and a second apparatus via at least one packet-based network, at least one of the first and second apparatus providing two or more selectable codecs for communicating towards another apparatus of the first apparatus and the second apparatus, wherein the apparatus is configured to receive, from the first apparatus, information on one or more codecs supported by the first apparatus, wherein the apparatus is further configured to forward this information on the codecs supported by the first apparatus to the second apparatus, and wherein the apparatus is configured to receive, from the second network element, a list of codecs supported by both the first apparatus and the second apparatus, the codec selection procedure being performed based on the list received from the second apparatus.

19. An apparatus according to claim 18, wherein the apparatus is a support node or a means providing a support function.

20. An apparatus according to claim 18, wherein the apparatus is configured to use a call control protocol for sending or receiving information on supported or selected codecs to and from the network elements.

21. An apparatus according to claim 20, wherein the protocol is a session initiation protocol.

22. An apparatus according to claim 18, being configured to send information on the selected codec as part of a negotiation procedure related to packet data convergence protocol, or in an activate packet data protocol context message.

23. A method, comprising:
performing, at a third apparatus, a codec selection procedure, the codec selection procedure selecting a same codec for bidirectional communication between a first and a second apparatus via at least one packet-based network, at least one of the first and second apparatus providing two or more selectable codecs for communicating towards another apparatus of the first apparatus and the second apparatus;

receiving, at the third apparatus, from the first apparatus, information on one or more codecs supported by the first apparatus;

forwarding this information on the codecs supported by the first apparatus to the second apparatus; and receiving, from the second network element, a list of codecs supported by both the first apparatus and the second apparatus, the codec selection procedure being performed based on the list received from the second apparatus.

* * * * *